US012745043B2

(12) United States Patent
Xu et al.

(10) Patent No.: US 12,745,043 B2
(45) Date of Patent: Sep. 22, 2026

(54) MICRO SPEAKER STRUCTURE INCLUDING DIAPHRAGM WITH LOCALLY THINNER REGIONS AND METHOD FOR FORMING THE SAME

(71) Applicant: Fortemedia, Inc., Alviso, CA (US)

(72) Inventors: Yu-Xuan Xu, Hsinchu City (TW); Ya-Chun Chang, Hsinchu City (TW); Quanli Lu, Alviso, CA (US); Shih-Chin Gong, Taipei City (TW)

(73) Assignee: FORTEMEDIA, INC., Alviso, CA (US)

( * ) Notice: Subject to any disclaimer, the term of this patent is extended or adjusted under 35 U.S.C. 154(b) by 159 days.

(21) Appl. No.: 18/775,410

(22) Filed: Jul. 17, 2024

(65) Prior Publication Data

US 2026/0025620 A1 Jan. 22, 2026

(51) Int. Cl.

| | |
|---|---|
| ***H04R 7/06*** | (2006.01) |
| ***H04R 9/02*** | (2006.01) |
| ***H04R 9/04*** | (2006.01) |
| ***H04R 9/06*** | (2006.01) |
| ***H04R 31/00*** | (2006.01) |

(52) U.S. Cl.

CPC ............... *H04R 7/06* (2013.01); *H04R 9/025* (2013.01); *H04R 9/047* (2013.01); *H04R 9/06* (2013.01); *H04R 31/003* (2013.01); *H04R 2201/003* (2013.01); *H04R 2307/025* (2013.01)

(58) Field of Classification Search

CPC .......... H04R 7/06; H04R 9/025; H04R 9/047; H04R 9/06; H04R 31/003; H04R 2001/003; H04R 2307/025

See application file for complete search history.

(56) References Cited

U.S. PATENT DOCUMENTS

| | | | | |
|---|---|---|---|---|
| 2022/0141595 A1* | 5/2022 | Chen | ........................ | H04R 9/06 381/19 |
| 2024/0007793 A1* | 1/2024 | Xu | ........................... | H04R 7/02 |

* cited by examiner

*Primary Examiner* — Sunita Joshi

(74) *Attorney, Agent, or Firm* — McClure, Qualey & Rodack, LLP

(57) ABSTRACT

A micro speaker structure is provided, including a substrate, a diaphragm, a coil, a carrier board, and a permanent magnetic element. The substrate has a hollow chamber. The diaphragm is disposed over the substrate and covers the hollow chamber. The diaphragm includes an etching pattern recessed form a first surface of the diaphragm. Etching patterns are used to increase sound pressure level at special frequency range. The coil is embedded in the diaphragm. The carrier board is disposed on the bottom surface of the substrate. The permanent magnetic element is disposed on the carrier board and in the hollow chamber. The first surface of the diaphragm faces the permanent magnetic element.

13 Claims, 14 Drawing Sheets

MICRO SPEAKER STRUCTURE INCLUDING DIAPHRAGM WITH LOCALLY THINNER REGIONS AND METHOD FOR FORMING THE SAME

BACKGROUND OF THE INVENTION

Field of the Invention

The invention relates in general to a micro speaker structure, and in particular to a micro speaker structure and a method for forming the same.

Description of the Related Art

Since electronic products are becoming smaller and thinner, how to scale down the size of electronic products has become an important topic. Micro electromechanical system (MEMS) technology is a technology that combines semiconductor processing and mechanical engineering, which can effectively reduce the size of components and produce multi-functional micro elements and micro systems.

The manufacturing of traditional moving coil speakers has become quite mature, but traditional moving coil speakers have a large size and take up much space. If the MEMS process is used to manufacture a moving coil speaker on a semiconductor chip, its size and volume will be reduced. However, in addition to the need to reduce the size to facilitate manufacturing, it is still necessary to develop a micro speaker with better performance.

BRIEF SUMMARY OF THE INVENTION

An embodiment of the invention provides a micro speaker structure. The micro speaker structure includes a substrate, a diaphragm, a coil, a carrier board, and a first permanent magnetic element. The substrate has a hollow chamber. The diaphragm is disposed over the substrate and covers the hollow chamber. The diaphragm includes an etching pattern recessed form a first surface of the diaphragm. The coil is embedded in the diaphragm. The carrier board is disposed on the bottom surface of the substrate. The first permanent magnetic element is disposed on the carrier board and in the hollow chamber. The first surface of the diaphragm faces the first permanent magnetic element.

In some embodiments, the thickness of the etching pattern is smaller than the thickness of the diaphragm.

In some embodiments, the coil and the etching pattern are located at the same side of the diaphragm, and the thickness of the etching pattern is smaller than the thickness of the coil.

In some embodiments, the etching pattern is spaced apart from the coil when viewed in plan view.

In some embodiments, the diaphragm includes a center region and a peripheral region surrounding the center region in plan view, and the coil is formed in the center region and the etching pattern is formed in the peripheral region.

In some embodiments, the etching pattern includes an annular, arc-shaped, slit-shaped, teardrop-shaped, strip-shaped, or circular recess.

In some embodiments, the diaphragm includes a photosensitive polymer material.

In some embodiments, the diaphragm includes a non-photosensitive polymer material.

In some embodiments, the micro speaker structure further includes an etch stop layer disposed over the first surface of the diaphragm and directly below the coil, and the etching pattern is exposed at the first surface and not covered by the etch stop layer.

In some embodiments, the carrier board includes one or more vent holes, and the vent holes allow the hollow chamber to communicate with an external environment.

In some embodiments, the micro speaker structure further includes a lid wrapped around the substrate and the diaphragm, and the lid has a lid opening that exposes a portion of a second surface of the diaphragm opposite the first surface.

In some embodiments, the micro speaker structure further includes a second permanent magnetic element disposed on the lid, and the diaphragm and the coil are located between the first permanent magnetic element and the second permanent magnetic element.

In some embodiments, the second permanent magnetic element is disposed under the lid opening.

In some embodiments, the coil includes a first metal layer and a second metal layer, the first metal layer has a spiral structure surrounding the central axis of the diaphragm, and the second metal layer crosses over the spiral structure of the first metal layer and is electrically connected to the first metal layer.

Another embodiment of the invention provides a method for forming a micro speaker structure. The method includes forming a patterned etch stop layer over a substrate. The method includes forming a coil over the patterned etch stop layer. The method includes forming a patterned dielectric layer comprising a first portion covering the coil and a second portion over the substrate and separated from the first portion. The method includes forming a diaphragm over the substrate, the coil, and the patterned dielectric layer, wherein the coil and the patterned dielectric layer are embedded in the diaphragm. The method includes forming a hollow chamber in the substrate. The method includes removing the second portion of the patterned dielectric layer to form an etching pattern in the diaphragm, wherein the etching pattern is recessed form the bottom surface of the diaphragm facing the hollow chamber. The method includes attaching a carrier board to the bottom surface of the substrate, wherein a first permanent magnetic element is mounted on the carrier board and positioned in the hollow chamber.

In some embodiments, forming the hollow chamber and removing the second portion of the patterned dielectric layer are performed through an etching process, and the patterned etch stop layer protects the coil and the first portion of the patterned dielectric layer from being etched during the etching process.

In some embodiments, the etching pattern does not overlap the coil in plan view.

In some embodiments, the diaphragm includes a photosensitive polymer material.

In some embodiments, forming the coil includes forming a first metal layer over the patterned etch stop layer, forming a dielectric layer on the first metal layer, and forming a second metal layer on the dielectric layer.

In some embodiments, the method further includes mounting a lid on the carrier board, and the lid is wrapped around the substrate and the diaphragm and has a lid opening that exposes a portion of the diaphragm.

BRIEF DESCRIPTION OF DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION OF INVENTION

Figure 1A:
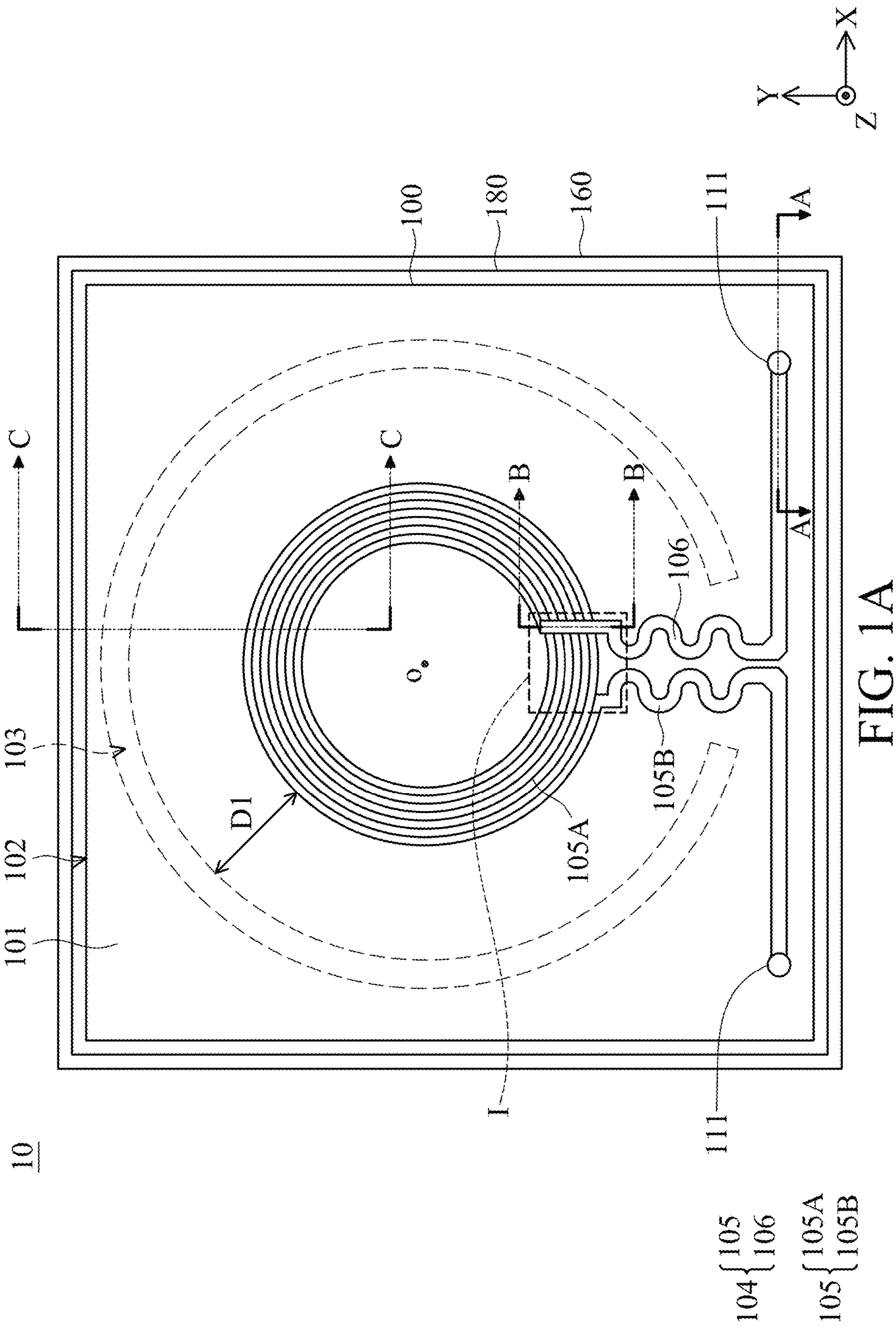
FIG. 1A illustrates a top view of a micro speaker structure, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device (or structure) in use or operation in addition to the orientation depicted in the figures. The device may be otherwise oriented (rotated 90 degrees or at other orientations) and the spatially relative descriptors used herein may likewise be interpreted accordingly.

When a number or a range of numbers is described with "about," "approximate," and the like, the term is intended to encompass numbers that are within a reasonable range including the number described, such as within +/−10% of the number described, or other values as understood by person skilled in the art. For example, the term "about 5 μm" encompasses the dimension range from 4.5 μm to 5.5 μm.

Furthermore, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

Unless defined otherwise, all terms (including technical and scientific terms) used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise. For example, the term "permanent magnetic element" used in the present disclosure refers to an element that can maintain magnetism for a long time. That is, the permanent magnetic element is not easy to lose magnetism and is not easy to be magnetized. In addition, permanent magnetic elements can also be referred to as "hard magnetic elements."

Some embodiments of the present disclosure provide a micro speaker structure. An etching pattern may be formed on the diaphragm (e.g., its bottom surface) of the micro speaker structure to change the characteristic (e.g., elasticity) of the diaphragm, so that the sensitivity of the micro speaker structure can be enhanced. Some variants of some embodiments are described. The method for forming these micro speaker structures is also described below.

FIG. 1A is a top view illustrating a micro speaker structure 10, in accordance with some embodiments. The micro speaker structure 10 is an electroacoustic transducer, such as a micro moving coil speaker, and may be disposed in general electronic products. As shown in FIG. 1A, the micro speaker structure 10 includes a substrate 100, a diaphragm 102, a (multi-layered) coil 104, a carrier board 160, and a lid 180. It should be noted that in the example of FIG. 1A, the diaphragm 102 and the lid 180 are only represented by rectangles in order to show the internal structure of the micro speaker structure 10.

Figure 1B:
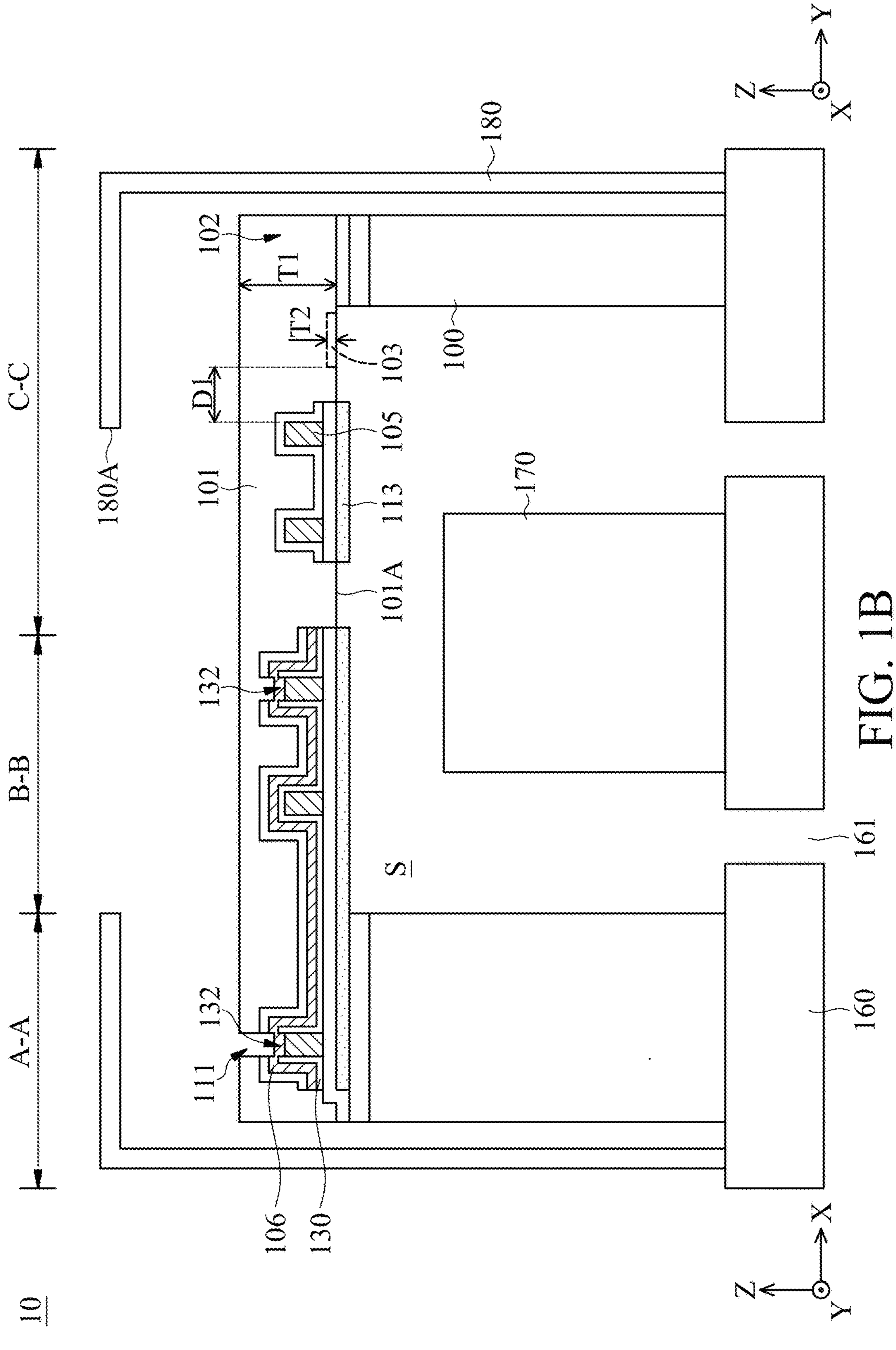
FIG. 1B illustrates a cross-sectional view of the micro speaker structure shown in FIG. 1A, in accordance with some embodiments.

FIG. 1B illustrates a cross-sectional view of the micro speaker structure 10 shown in FIG. 1A, in accordance with some embodiments. Referring to FIG. 1B, a hollow chamber S is formed in the substrate 100. The hollow chamber S may have a circular shape in plan view. The diaphragm 102 is disposed above the substrate 100 and can elastically deform (e.g., oscillate) in the normal direction of the substrate 100 (e.g., the Z-axis direction). Specifically, the diaphragm 102 includes a central portion (sometimes also referred as the movable portion) disposed (e.g., suspended) above the hollow chamber S of the substrate 100 and a peripheral portion (sometimes also referred as the fixed portion) surrounding the central portion and attached (e.g., fixed) to the substrate 100.

The multi-layered coil 104 is embedded in the diaphragm 102, which means that the multi-layered coil 104 is not exposed. As shown in the FIGS. 1A and 1B, the multi-layered coil 104 is embedded in the central portion of the diaphragm 102 (e.g., aligned with the hollow chamber S in plan view). The multi-layered coil 104 is configured to transmit electric signals from a control unit (not shown), and drives the diaphragm 102 to deform relative to the substrate 100 according to the electric signals. At present, resistances of speakers are mostly 852 or 3252, which is lower than that of single-layer coils. The multi-layered coils of the present disclosure can easily meet the resistance requirements. The structure of the multi-layered coil 104 will be described later.

In some embodiments, the diaphragm 102 includes a main body 101 and an etching pattern 103 formed on the main body 101. The etching pattern 103 may be a pattern etched (e.g., recessed) from a surface (e.g., the bottom surface 101A) of the diaphragm 102 such that the diaphragm 102 has a locally thinner region. This may change the characteristic (e.g., increase elasticity) of the diaphragm 102 to enhance the sensitivity and increase the sound pressure level (SPL) of the micro speaker structure 10 within a certain frequency band (e.g., <10 KHz).

In some embodiments, the etching pattern 103 is formed in a local area of the diaphragm 102 and does not overlap the coil 104 in plan view. More specifically, the diaphragm 102 includes a center region (not specifically marked) and a peripheral region (not specifically marked) surround the center region in plan view (top view), wherein the coil 104 is formed in the center region and the etching pattern 103 is formed in the peripheral region. In some embodiment, the closest points of the etching pattern 103 and the coil 104 are laterally separated by a distance D1, such as between about 5 μm and 500 μm in some cases, although smaller or larger distances may be used. In some embodiments, the etching pattern 103 includes a substantially annular recess and surrounds the central axis O of the diaphragm 102 (e.g., the circular hollow chamber S) in plan view, as shown in FIG. 1A, but other shapes and configurations may be used (which will be described later).

In some embodiments, the etching pattern 103 will not vertically penetrate the entire diaphragm 102 (e.g., the main body 101) to ensure that the diaphragm 102 maintains sufficient mechanical strength. For example, the main body 101 has a thickness T1 (in the Z-axis direction), the etching pattern 103 has a thickness T2 (in the Z-axis direction), and the thickness T1 is greater than the thickness T2. In some embodiments, the thickness T1 may be in a range between about 1 μm and about 20 μm, but smaller or larger thicknesses may be used. In some embodiments, the thickness T2 is about one third to one half of the thickness T1, but smaller or larger thicknesses may be used. In some embodiments, the thickness T2 of the etching pattern 103 is smaller than the thickness (not specifically marked) of the multi-layered coil 104.

As shown in FIGS. 1A and 1B, the multi-layered coil 104 includes a first metal layer 105 and a second metal layer 106. The first metal layer 105 is electrically connected to the second metal layer 106 in one opening 111 of the diaphragm 102 to transmit electrical signals that control the operation of the micro speaker structure 10. In some embodiments, the first metal layer 105 includes a spiral structure 105A located in the center of the diaphragm 102 and a wavy structure 105B extending from the spiral structure 105A to the periphery of the diaphragm 102. The spiral structure 105A is disposed around the central axis O of the diaphragm 102, and the wavy structure 105B connects the spiral structure 105A to the opening 111. By providing the wavy structure 105B, the diaphragm 102 can be more flexible, and the difficulty of the oscillation can be reduced. In some cases, the second metal layer 106 may also include a wavy structure.

Figure 2:
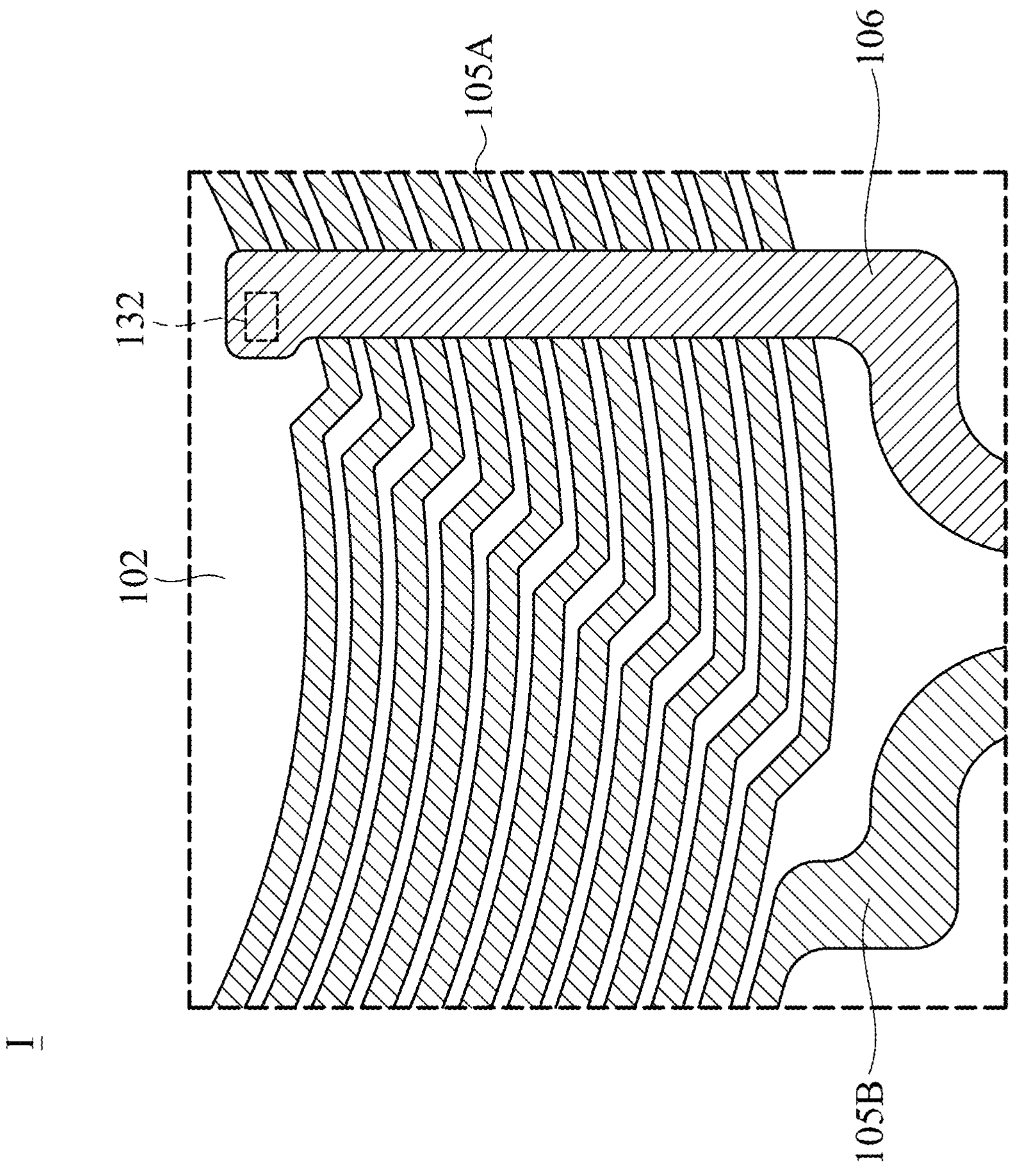
FIG. 2 illustrates an enlarged view of the area I shown in FIG. 1A, in accordance with some embodiments.

FIG. 2 illustrates an enlarged view of the area I shown in FIG. 1A, in accordance with some embodiments. Referring to FIGS. 1B and 2, the first metal layer 105 and the second metal layer 106 are located on different horizontal planes parallel to the X-Y plane, and the second metal layer 106 is higher than the first metal layer 105. That is, the second metal layer 106 is closer to the top of the diaphragm 102 than the first metal layer 105. A dielectric layer 130 (see FIG. 1B) is disposed between the first metal layer 105 and the second metal layer 106 to prevent a short circuit between the first metal layer 105 and the second metal layer 106. A conductive via 132 is formed in the dielectric layer 130. The second metal layer 106 crosses over the spiral structure 105A and is electrically connected to the first metal layer 105 through the conductive via 132.

Referring back to FIG. 1B, a first permanent magnetic element 170 is disposed below the diaphragm 102 in accordance with some embodiments. The first permanent magnetic element 170 improves the frequency response of the diaphragm 102, which will be described in more detail below. It should be noted that, in order to simplify the figure, FIG. 1A does not show the first permanent magnetic element 170.

The above-mentioned components of the micro speaker structure 10 may be disposed above the carrier board 160 (e.g., a printed circuit board (PCB)). The carrier board 160 has vent holes 161 that allow the interior space of the micro speaker structure 10 (e.g., the hollow chamber S between the diaphragm 102 and the carrier board 160) to communicate with the external environment. The lid 180 (sometimes also called a package lid) is attached to the carrier board 160 and wraps around the various components mentioned above for protection. The lid 180 may have a lid opening 180A to allow acoustic energy due to vibration of the diaphragm 102 to travel out of the micro speaker structure 10.

FIGS. 3A to 3H illustrate cross-sectional views of intermediate stages in the formation of a micro speaker structure (e.g., the above-mentioned micro speaker structure 10), in accordance with some embodiments. It should be understood that each of the figures includes cross-sectional views along lines A-A, B-B, and C-C shown in FIG. 1A. In this way, the fabrication processes of different parts of the micro speaker structure 10 can be shown in a single figure. Two sets of coordinate axes are provided in FIGS. 3A to 3H, wherein one set of coordinate axes in the left-hand side correspond the cross-sectional view along line A-A, and the other set of coordinate axes in the right-hand side correspond the cross-sectional views along lines B-B and C-C.

Figure 3A:
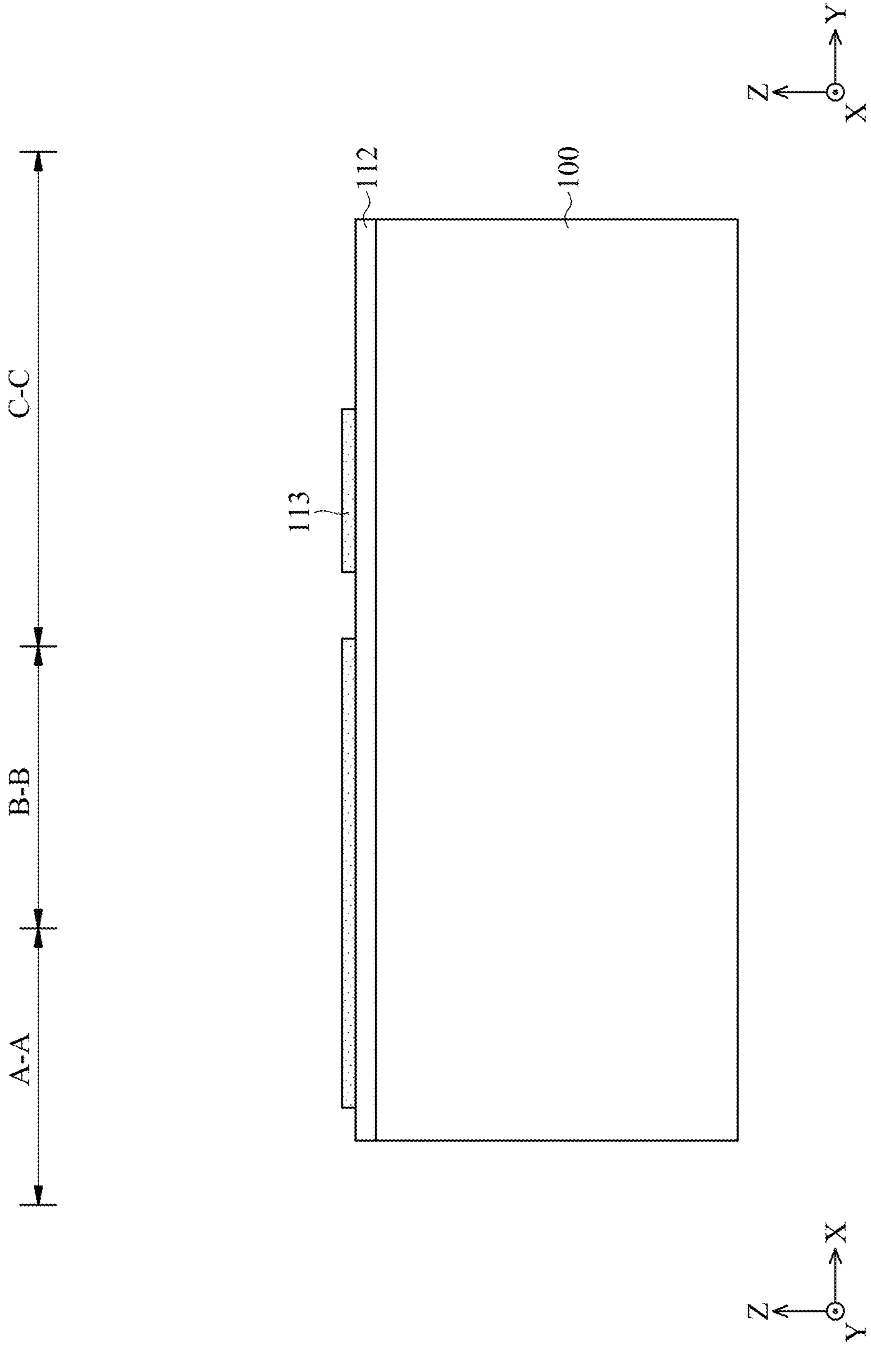
FIGS. 3A to 3H illustrate cross-sectional views of intermediate stages in the formation of a micro speaker structure, in accordance with some embodiments.

Referring to FIG. 3A, a substrate 100 is first provided. In some embodiments, the substrate 100 is part of a semiconductor wafer, and may be formed of silicon (Si). Alternatively, the substrate 100 may include other semiconductor materials, such as germanium; a compound semiconductor including silicon carbide (SiC), gallium arsenic (GaAs), gallium phosphide (GaP), gallium nitride (GaN), indium phosphide (InP), and/or indium arsenide (InAs); an alloy semiconductor including SiGe, SiGeC, GaAsP, GaInAs, and/or InGaP; or combinations thereof. In some embodiments, the thickness (e.g., in the Z-axis direction) of the substrate 100 may be between about 100 μm and about 1000 μm.

A dielectric layer 112 is formed on the top surface of the substrate 100. In some embodiments, the dielectric layer 112 is made of or includes silicon dioxide ($SiO_2$) or another suitable insulating material, and may be formed by thermal oxidation, chemical vapor deposition (CVD), low pressure CVD (LPCVD), atmospheric pressure CVD (APCVD), plasma-enhanced CVD (PECVD), or another suitable process.

An etch stop (metal) layer 113 is then formed on the dielectric layer 112. In some embodiments, the etch stop layer 113 is made of or includes aluminum, copper, aluminum-copper alloy, aluminum-silicon alloy, aluminum-silicon-copper alloy, or another suitable metal material that can protect the subsequently formed multi-layered coil 104 (see FIG. 3C) from being etched during a subsequent etching process of the substrate 100 (see FIG. 3F). The etch stop layer 113 may be formed by electroplating or another deposition process, such as physical vapor deposition (PVD), sputtering, or evaporation. A patterning process (not specifically shown) may be then performed on the etch stop layer 113 such that the remainder of the patterned etch stop layer 113 is located directly beneath the subsequently formed multi-layered coil 104 and overlaps the multi-layered coil 104 in plan view. The patterning process may include photolithography processes (for example, photoresist coating, soft baking, mask alignment, exposure, post-exposure baking, photoresist development, other suitable processes or a combination thereof), etching processes (for example, wet etching process, dry etching process, other suitable processes or a combination thereof), other suitable processes, or a combination thereof.

Figure 3B:
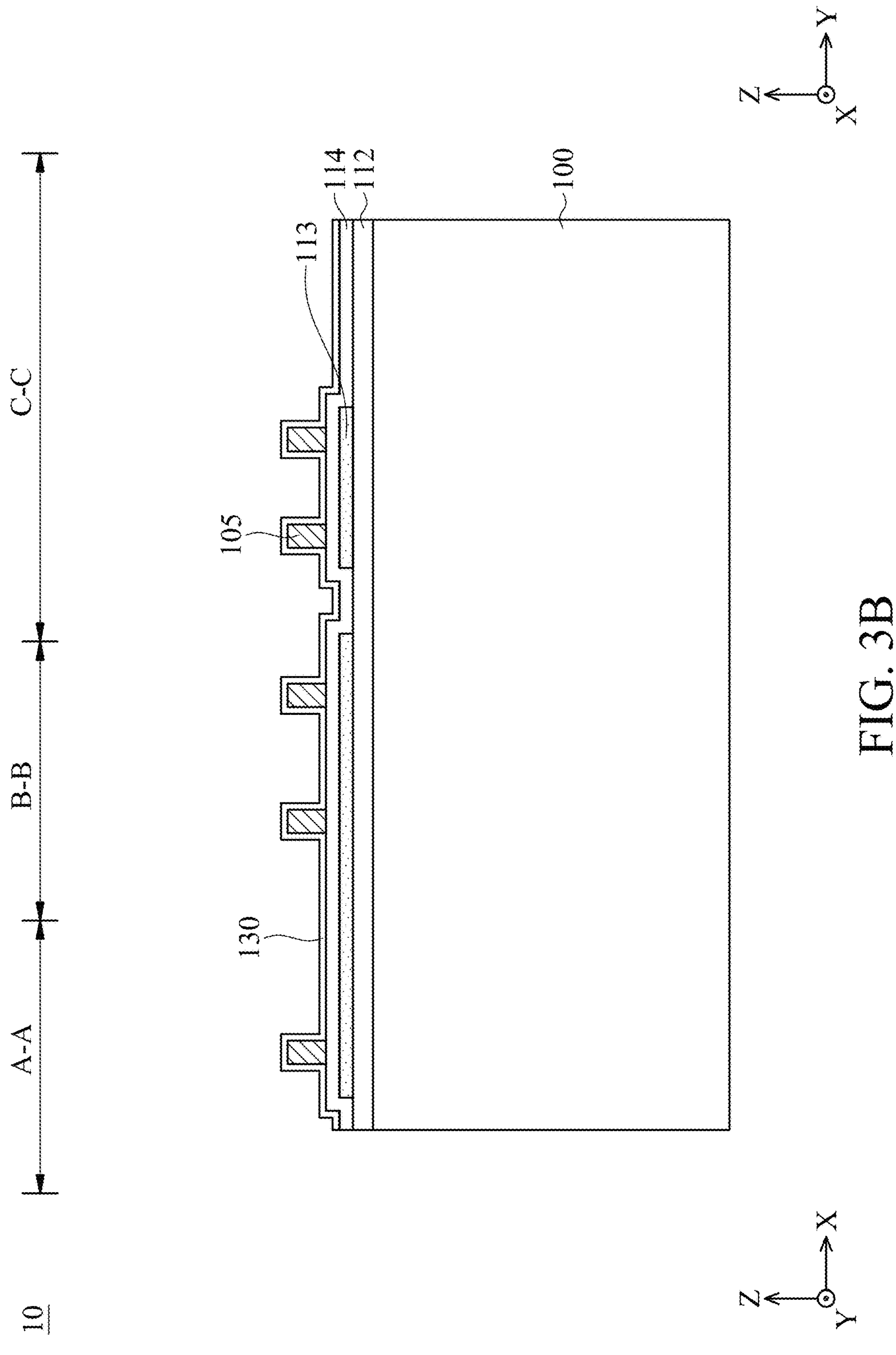
Figure 3C:
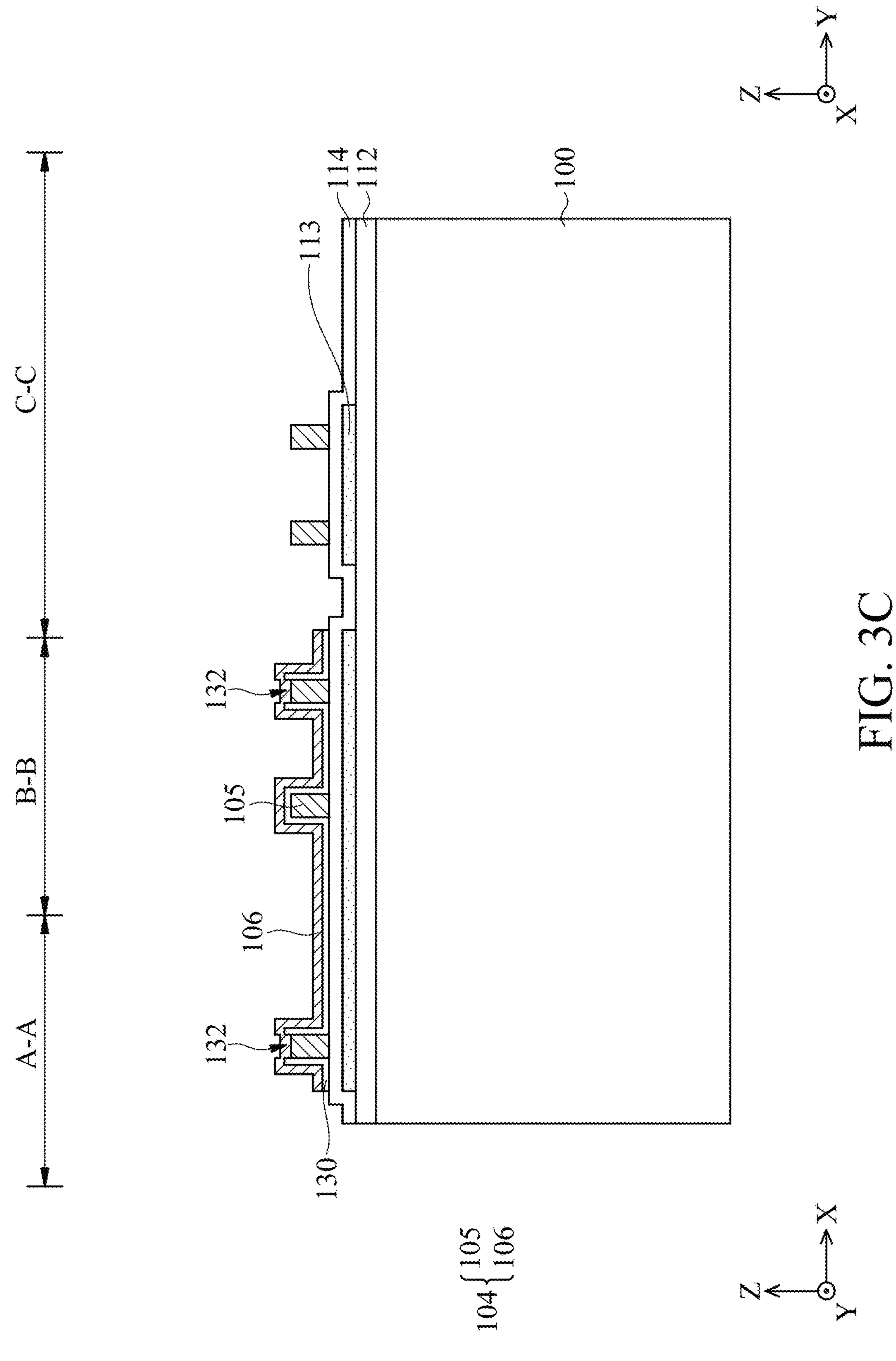

In some embodiments, the patterned etch stop layer 113 is a complete continuous structure for the overlying multi-layered coil 104 (see FIG. 3C). For example, the patterned etch stop layer 113 has no openings in the gaps between adjacent coil portions of the multi-layered coil 104 (the terms "coil portions" used herein refer to the solid portions of the multi-layered coil 104, such as the spiral structure 105A of the first metal layer 105). In other embodiments, the patterned etch stop layer 113 is a discontinuous structure, and includes a plurality of discrete (solid) portions corresponding to (e.g., located directly beneath) coil portions of the multi-layered coil 104, with openings formed between adjacent coil portions. In some embodiments, the thickness of the etch stop layer 113 may preferably be more than 100 μm for better protection, but the present disclosure is not limited thereto.

Next, in FIG. 3B, a dielectric layer 114 is conformally formed on the etch stop layer 113 (for example, the portions of dielectric layer 114 over the top surface and sidewalls of the etch stop layer 113 have the same thickness) and the dielectric layer 112. The materials and formation method of the dielectric layer 114 may be the same as or similar to those of the dielectric layer 112, and are not repeated here.

After the dielectric layer 114 is formed, the first metal layer 105 of the multi-layered coil 104 is formed on the dielectric layer 114. In some embodiments, the material of the first metal layer 105 includes aluminum silicon alloy, aluminum, copper, or another suitable conductive material. The first metal layer 105 may be formed using electroplating or another deposition process, such as PVD, sputtering, or evaporation. The first metal layer 105A is then patterned (e.g., through a photolithography process and an etching process, not specifically shown) to form the spiral structure 105A and the wavy structure 105B as shown in FIG. 1A. In some embodiments, the line width of the first metal layer 105 may be between about 1 μm and about 500 μm, and the thickness (e.g., in the Z-axis direction) of the first metal layer 105 may be between about 0.1 μm and about 20 μm.

Still referring to FIG. 3B, another dielectric layer 130 is conformally formed on the first metal layer 105 (for example, the portions of dielectric layer 130 over the top surface and sidewalls of the first metal layer 105 have the same thickness) and the dielectric layer 114. In some embodiments, the dielectric layer 130 is made of or includes carbon-doped oxides or other suitable insulating materials, and may be formed through furnace process or CVD process.

Next, in FIG. 3C, the dielectric layer 130 is patterned (e.g., through a photolithography process and an etching process, not specifically shown) to form through holes in the dielectric layer 130 to expose the underlying first metal layer 105. The second metal layer 106 of the multi-layered coil 104 is then formed on the dielectric layer 130 and the first metal layer 105 using electroplating or another deposition process, such as PVD, sputtering, or evaporation. In some embodiments, the material of the second metal layer 106 includes aluminum silicon alloy, aluminum, copper, or another suitable conductive material. A patterning process (e.g., including a photolithography process and an etching process, not specifically shown) is then performed on the second metal layer 106, thereby leaving portions located on the dielectric layer 130 and in the through holes (thereby forming the conductive vias 132). In some embodiments, the line width of the second metal layer 106 may be between about 1 μm and about 500 μm, and the thickness (e.g., in the Z-axis direction) of the second metal layer 106 may be between about 0.1 μm and about 20 μm.

It should be noted that the patterned dielectric layer 130 only leaves a portion required to electrically insulate the first metal layer 105 (e.g., the spiral structure 105A) and the second metal layer 106. By removing undesired portions of the dielectric layer 130, the diaphragm 102 (see FIG. 3E) can be more flexible, thereby improving the performance of the micro speaker structure 10.

Figure 3D:
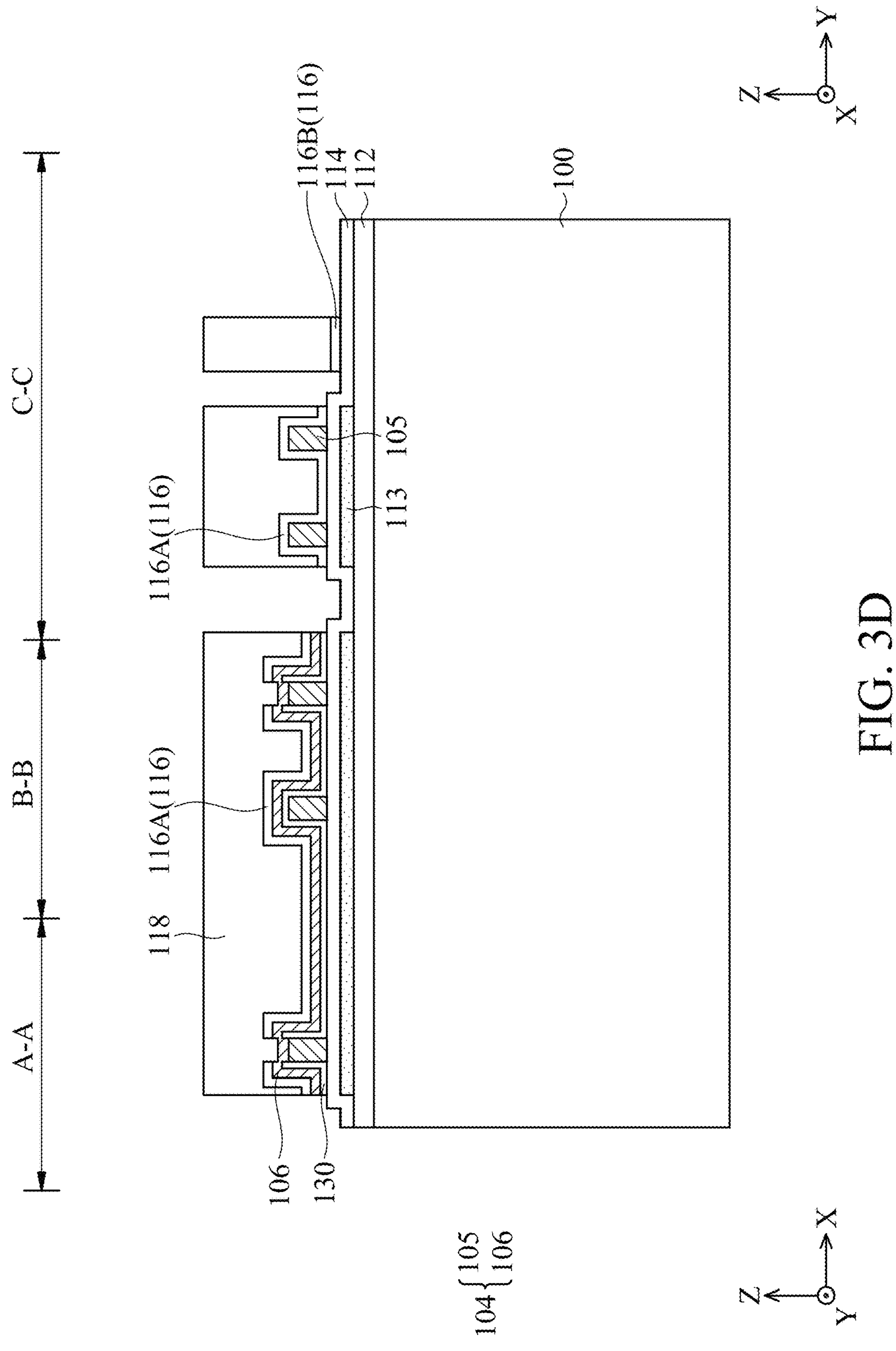

Next, in FIG. 3D, a dielectric layer 116 is conformally formed on the second metal layer 106 and first metal layer 105 of the multi-layered coil 104 and on the dielectric layer 114. In some embodiments, the dielectric layer 116 is made of or includes carbon-doped oxides or other suitable insulating materials, and may be formed through furnace process or CVD process. The thickness of the dielectric layer 116 may be in a range between about between about 0.05 μm and about 10 μm, but smaller or larger thicknesses may be used. The dielectric layer 116 is then subjected to a patterning process (e.g., including a photolithography process and an etching process, not specifically shown) using a patterned mask layer 118, thereby leaving a first portion 116A over the second metal layer 106 and first metal layer 105 of the multi-layered coil 104. The first portion 116A of the patterned dielectric layer 116 may be used to cover and protect the multi-layered coil 104 during subsequent processes (e.g., a backside grinding process of the substrate 100, not shown), and therefore the dielectric layer 116 may also be referred to herein as a protective layer.

Still referring to FIG. 3D, the patterning process further causes the patterned dielectric layer 116 to include a second portion 116B on the dielectric layer 114. It should be noted that the second portion 116B of the dielectric layer 116 may serve as a sacrificial structure that will be removed during a subsequent etching process of the substrate 100 (see FIG. 3F) to form the etching pattern 103 in the diaphragm 102 (which will be further described later). In this regard, the location, shape and dimensions (e.g., thickness and width) of the second portion 116B correspond to the location, shape and dimensions (e.g., thickness) of the etching pattern 103 to be formed (as described previously in FIG. 1B).

After the patterning process, the patterned mask layer 118 will be removed using a suitable process, such as ashing or dissolution by a solvent. In some embodiments, after removal of the patterned mask layer 118, an etch stop layer (not shown), which may be formed of silicon carbide, silicon nitride, silicon oxynitride, silicon oxycarbide, aluminum oxide, aluminum nitride, or the like, or multi-layers thereof, is further formed over the patterned dielectric layer 116 and the dielectric layer 114. The etching process of the substrate 100 illustrated in FIG. 3F will stop at this etch stop layer, so it will not damage the overlying diaphragm 102.

Figure 3E:
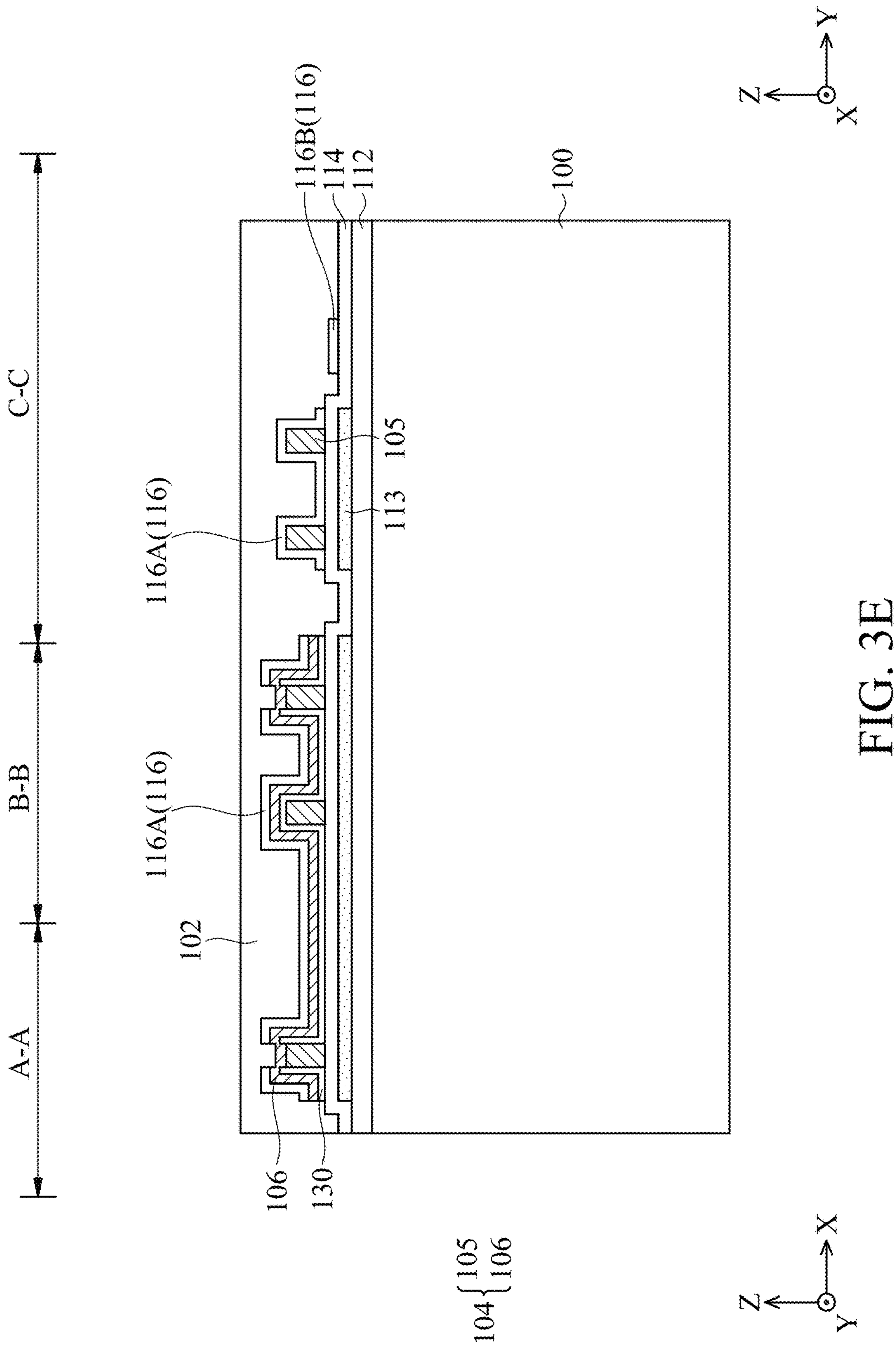

Next, in FIG. 3E, the diaphragm 102 is formed over the above-mentioned structures such that the multi-layered coil 104 (including the first metal layer 105 and the second metal layer 106) and the dielectric layer 130 are embedded in the diaphragm 102 (i.e., they are not exposed). The diaphragm 102 may be formed by spin coating, slot-die coating, blade coating, wire bar coating, gravure coating, spray coating, CVD, another applicable process, or a combination thereof. In some embodiments, the diaphragm 102 may be made of or include a photosensitive or non-photosensitive polymer material. In some cases, the diaphragm 102 is made of or includes polydimethylsiloxane (PDMS), phenolic epoxy resin (such as SU-8), polyimide (PI), polyamide (PA), or a combination thereof. In an example, the diaphragm 102 is formed of PDMS, and the Young's modulus of the diaphragm 102 is in a range between about 1 MPa and about 100 GPa. Compared with a diaphragm formed of polyimide, the diaphragm 102 formed of PDMS has a smaller Young's modulus and a softer film structure, which makes the diaphragm 102 have a larger displacement, thereby generating a larger sound amplitude.

Figure 3F:
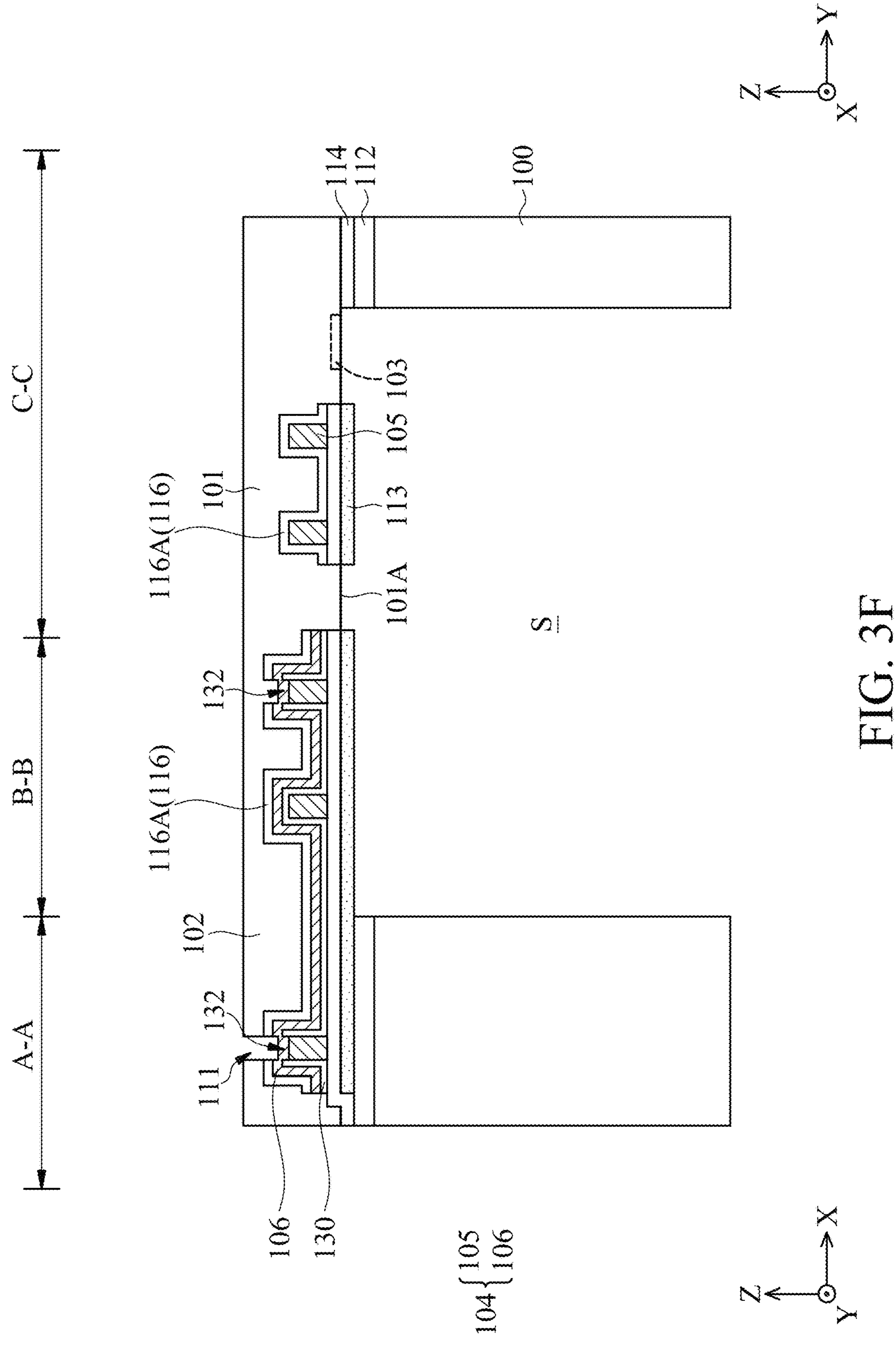

Next, in FIG. 3F, the diaphragm 102 is then patterned to form openings 111 (only one opening 111 is shown) in the diaphragm 102 and a cutting groove (not shown) surrounding the diaphragm 102. In some embodiments where the diaphragm 102 is made of a photosensitive polymer material, the openings 111 and the cutting groove may be formed by using photolithography and etching techniques. In some embodiments where the diaphragm 102 is made of a non-photosensitive polymer material, the openings 111 and the cutting groove may be formed by drilling, cutting, another suitable patterning technique, or a combination thereof. The openings 111 may expose the underlying second metal layer 106 such that the first metal layer 105 is electrically connected to the second metal layer 106 in one of the openings 111 (as mentioned above). In other words, when viewed along the vertical direction (e.g., the Z-axis direction), one of the openings 111 of the diaphragm 102 and one of the conductive vias 132 may overlap. The cutting groove can facilitate cutting process (not shown) to separate the micro speaker structures 10.

Still referring to FIG. 3F, a deep reactive-ion etching (RIE) process or another etching process which applies an etchant (such as ammonium hydroxide ($NH_4OH$), hydrofluoric acid (HF), deionized water, tetramethylammonium hydroxide (TMAH), potassium hydroxide (KOH)) is performed on the bottom surface of the substrate 100 to form a hollow chamber S in the substrate 100. The etching process may further remove the dielectric layer 112, the dielectric layer 114 and the second portion 116B of the dielectric layer 116 located over the hollow chamber S and below (or in) the diaphragm 102, as shown in FIG. 3F. In some embodiments, the etch stop metal layer 113 and the etch stop layer over the patterned dielectric layer 116 and the dielectric layer 114 (not shown, but discussed previously in FIG. 3F) may be used as etch stop layers of the etching process to protect the diaphragm 102 and the multi-layered coil 104 (and the overlying first portion 116A of the dielectric layer 116) from being etched. After the etching process, the portion of the diaphragm 102 originally occupied by the second portion 116B of the dielectric layer 116 forms the etching pattern 103 on the bottom surface 101A of the main body 101. More specifically, the etching pattern 103 is exposed at the bottom surface 101A and not covered by the etch stop metal layer 113. Therefore, the diaphragm 102 having locally thinner regions (i.e., where the etching pattern 103 is located) is achieved. This may change the characteristic (e.g., increase elasticity) of the diaphragm 102 to enhance the sensitivity of the micro speaker structure 10, as mentioned above. In some embodiments, the etching pattern 103 overlaps the hollow chamber S in plan view (e.g., see FIGS. 5A to 5H).

It should be understood that the diaphragm 102 made of a photosensitive polymer material is easier to process than a non-photosensitive polymer material. However, when the diaphragm 102 is made of a photosensitive polymer material (e.g., polyamide), a photoresist cannot be used as an etch mask over the diaphragm 102, and therefore a dry etching process cannot be used to from an etching pattern on the top surface of the diaphragm 102 to achieve local thinning of the diaphragm 102. In order to solve this problem, for case where the diaphragm 102 is made of a photosensitive polymer material, a new method for forming the etching pattern 103 in the diaphragm 102 (i.e., forming the diaphragm 102 with locally thinner regions) is proposed, as shown in FIGS. 3A to 3F.

Figure 3G:
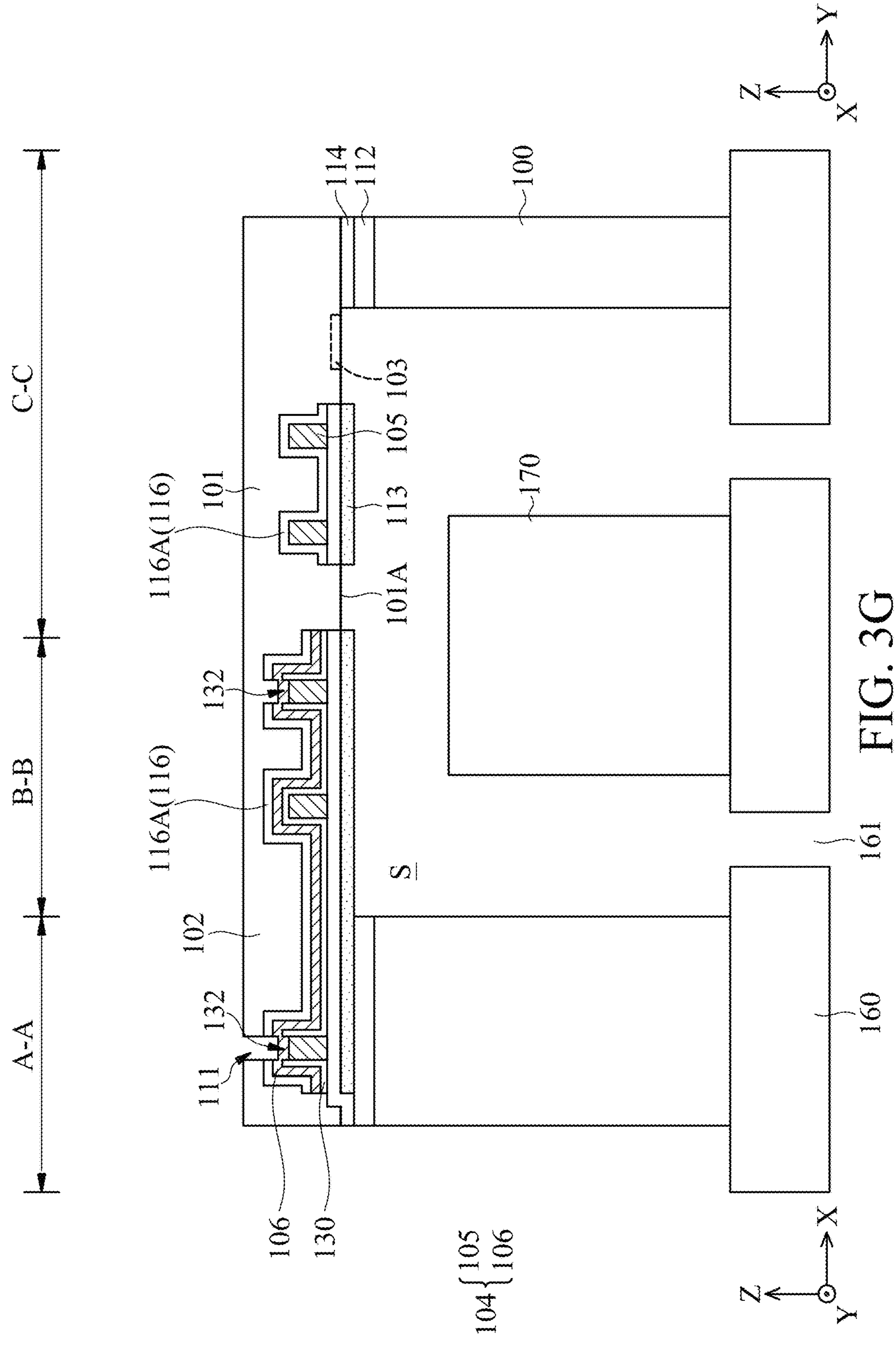

Next, in FIG. 3G, the carrier board 160 (such as a PCB) is disposed on or attached to the bottom surface of the substrate 100. Therefore, the substrate 100 is located between the carrier board 160 and the diaphragm 102. As mentioned above, the carrier board 160 has one or more vent holes 161 which allow the hollow chamber S to communicate with the external environment. The vent holes 161 may have circular, oval or another suitable cross-sectional shape.

Still referring to FIG. 3G, the first permanent magnetic element 170 is disposed on the carrier board 160 and in the hollow chamber S, so that the first permanent magnetic element 170 is disposed below the diaphragm 102. The first permanent magnetic element 170 is used to cooperate with the overlying multi-layered coil 104 (i.e., the magnetic field generated by the first permanent magnetic element 170 interacts with a current passing through the multi-layered coil 104) to generate a (Lorentz) force (e.g., Z-axis force) in the normal direction of the diaphragm 102 (i.e., the vertical/Z-axis direction, which is perpendicular to its top surface), and the diaphragm 102 can vibrate/oscillate relative to the substrate 100 due to the force to generate sound. In some embodiments, the first permanent magnetic element 170 may include a neodymium iron boron magnet.

Figure 3H:
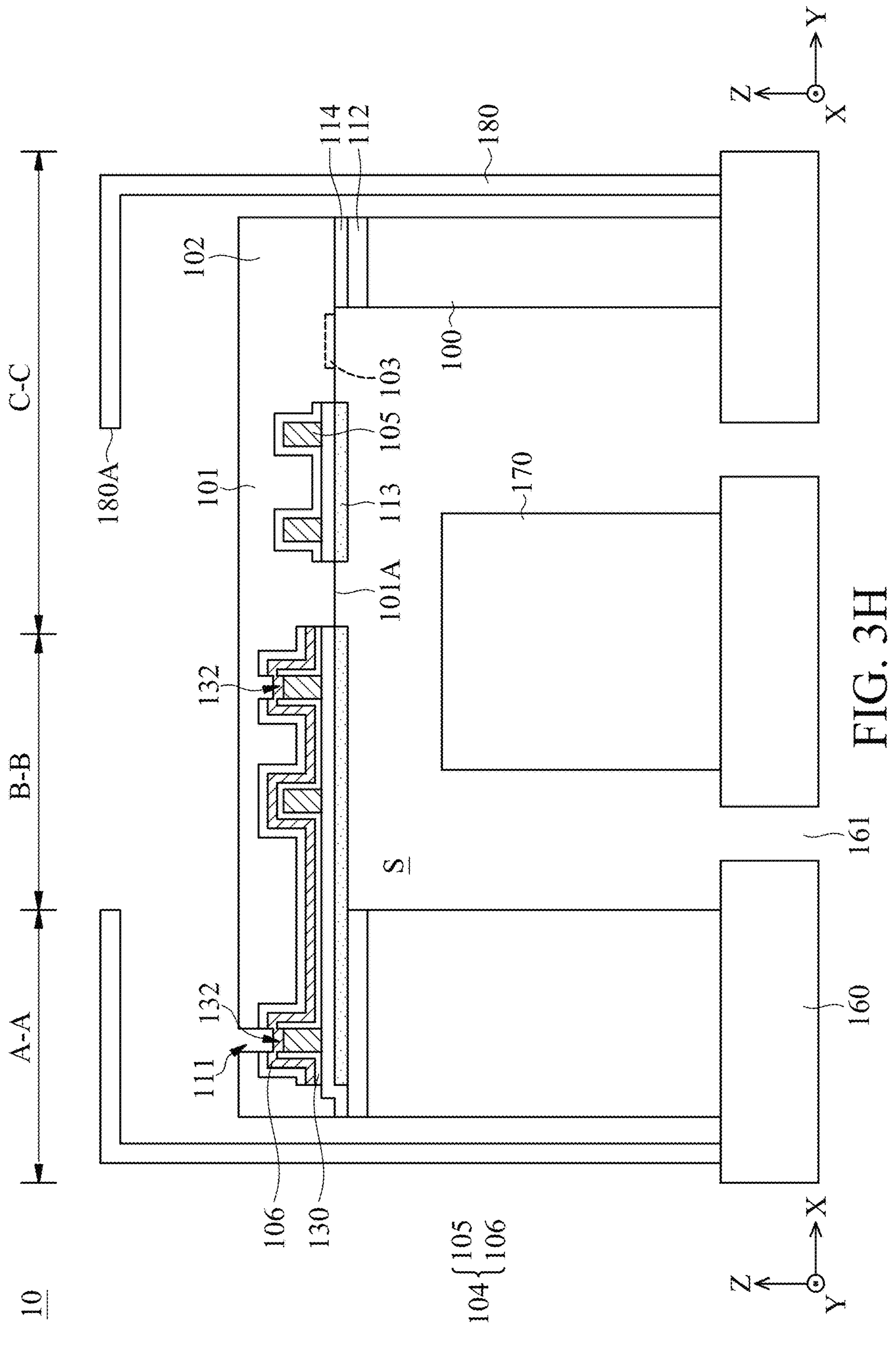

Next, in FIG. 3H, the lid 180 is disposed on the carrier board 160 and wraps around the substrate 100 and the diaphragm 102. The lid 180 has a lid opening 180A that exposes a portion of the top surface of the diaphragm 102 to allow air to exit the micro speaker structure 10, thereby producing sound. In some embodiments, the lid 180 may be made of or include a metal with magnetic permeability that is lower than $1.25 \times 10^{-4}$ H/m, such as gold (Au), copper (Cu), aluminum (Al), or a combination thereof.

After completing the formation processes shown in FIGS. 3A to 3H, the micro speaker structure 10 can be obtained.

Figure 4A:
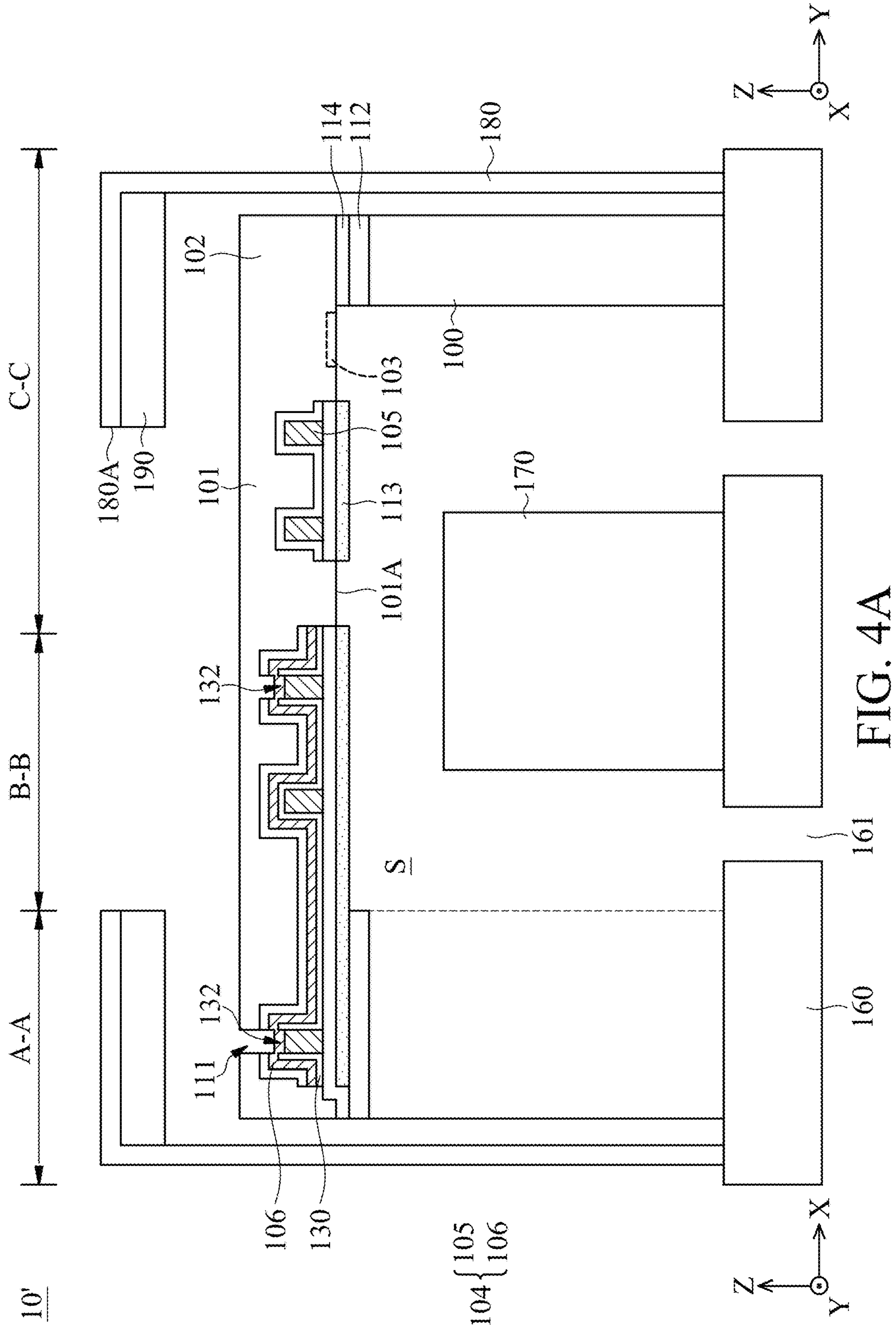
FIG. 4A illustrates a cross-sectional view of a micro speaker structure, in accordance with some embodiments.
Figure 4B:
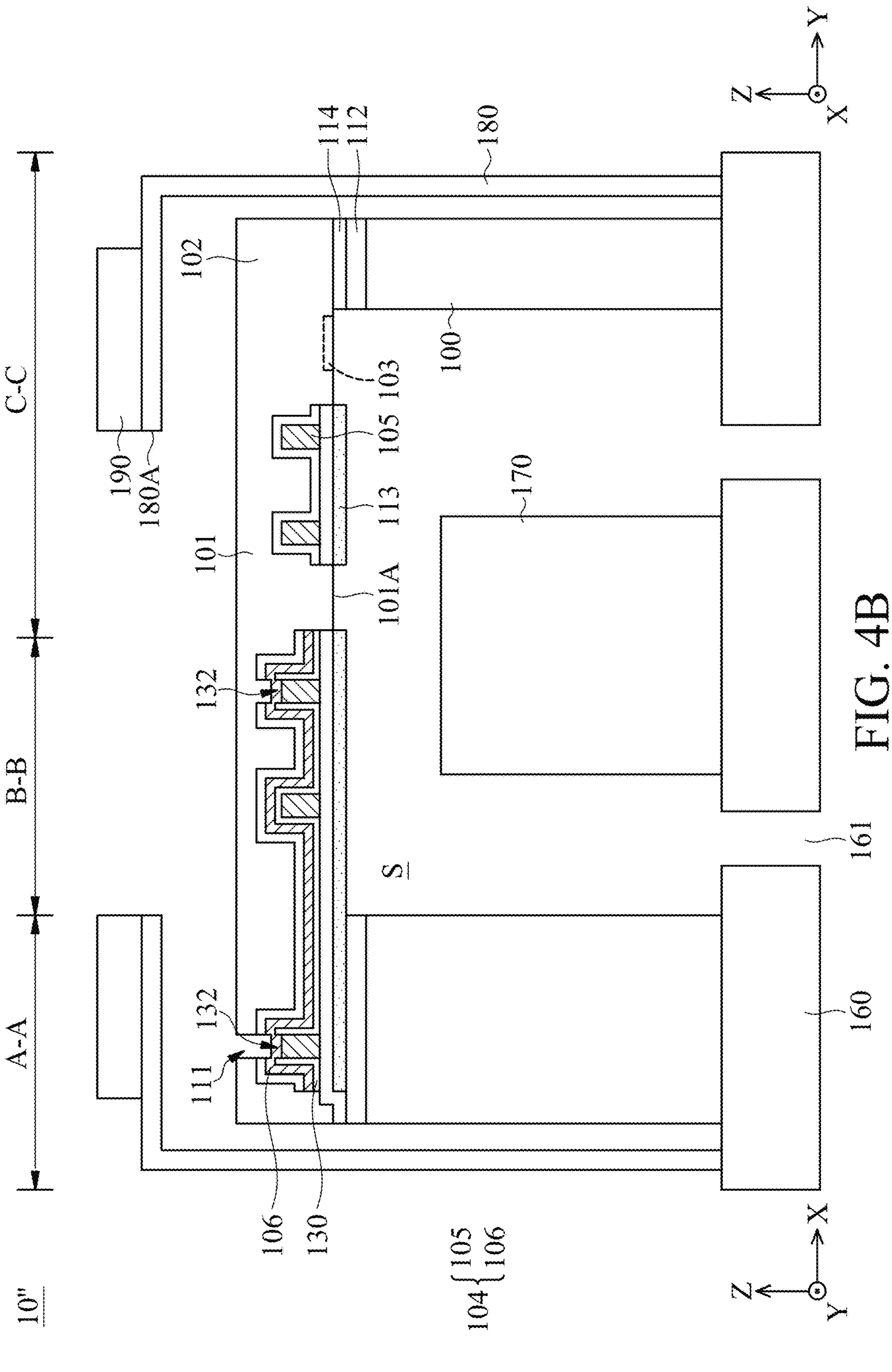
FIG. 4B illustrates a cross-sectional view of a micro speaker structure, in accordance with some embodiments.

FIGS. 4A and 4B illustrate cross-sectional views of micro speaker structures (10' and 10"), in accordance with some embodiments. As shown in FIGS. 4A and 4B, a second permanent magnetic element 190 may be disposed (e.g., fixed) on the lid 180, and may be disposed over the diaphragm 102. The second permanent magnetic element 190 may be annular and surround the lid opening 180A. In the example of FIG. 4A, the second permanent magnetic element 190 is disposed under the lid opening 180A. In the example of FIG. 4B, the second permanent magnetic element 190 is disposed above the lid opening 180A. The second permanent magnetic element 190 and the first permanent magnetic element 170 can attract each other to increase the deflection of the planar magnetic field. Therefore, the force generated by the current passing through the multi-layered coil 104 and the planar magnetic field in the normal direction of the substrate 100 is increased, so that the diaphragm 102 has a better frequency response, thereby improving the performance of the micro speaker structure (10' or 10"). In some embodiments, the second permanent magnetic element 190 may include a neodymium iron boron magnet.

In some embodiments, the (vertical) distance between the first permanent magnetic element 170 and the second permanent magnetic element 190 may be between 200 μm and 1000 μm. If the distance between the first permanent magnetic element 170 and the second permanent magnetic element 190 is greater than 1000 μm, there may not be sufficient attractive force between the two to increase the deflection of the planar magnetic field, resulting in a smaller frequency response of the micro speaker structure (10' or 10"), thereby reducing the performance of the micro speaker structure (10' or 10"). If the distance between the first permanent magnetic element 170 and the second permanent magnetic element 190 is less than 200 μm, when the diaphragm 102 deforms up and down relative to the substrate 100, it may repeatedly contact and strike the first permanent magnetic element 170 and the second permanent magnetic element 190, causing damage to the micro speaker structure (10' or 10"), thereby reducing the reliability of the micro speaker structure (10' or 10").

Figure 5A:
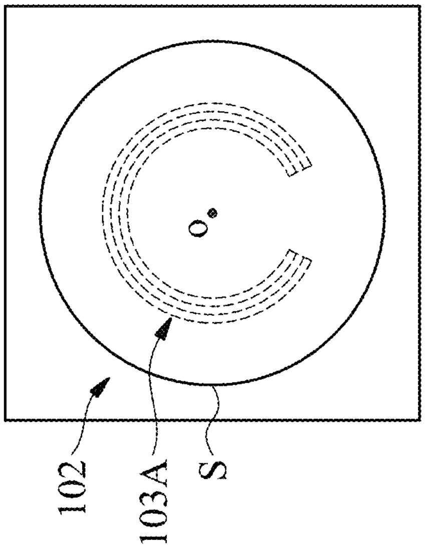
FIGS. 5A to 5F illustrate top views of diaphragms with etching patterns, in accordance with some embodiments.
Figure 5B:
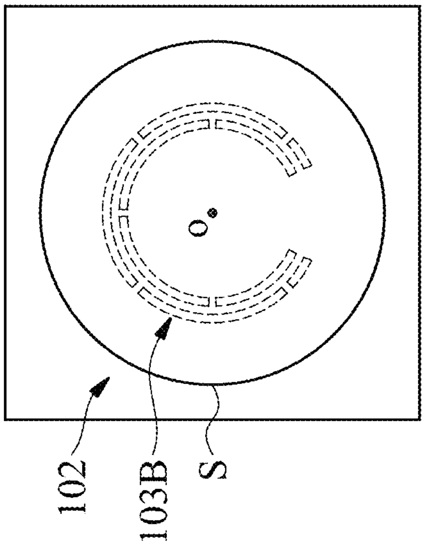
Figure 5C:
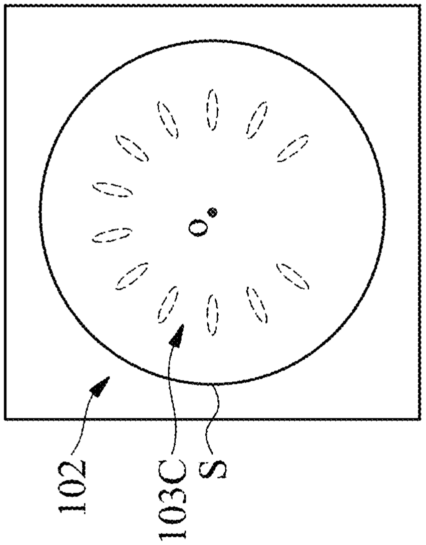
Figure 5D:
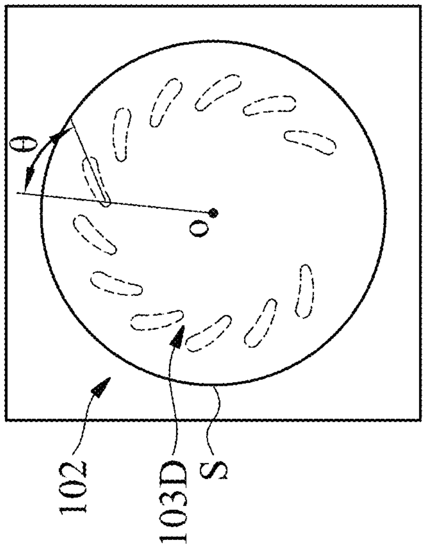
Figure 5E:
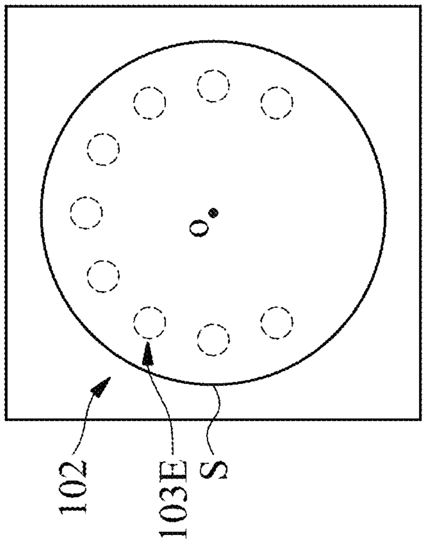
Figure 5F:
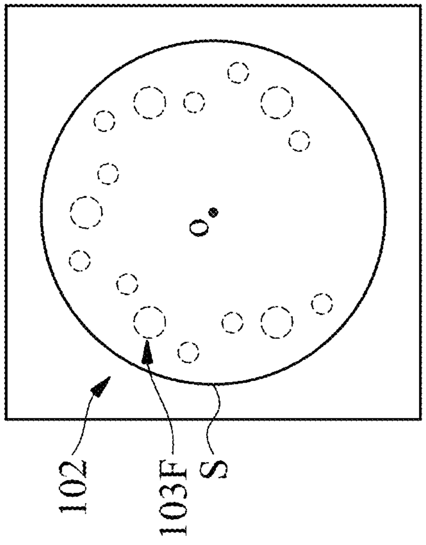

Many variations and/or modifications can be made to embodiments of the disclosure. For example, FIGS. 5A to 5F illustrate top views of diaphragms 102 with different etching patterns 103A, 103B, 103C, 103D, 103E, and 103F, in accordance with some embodiments. The etching patterns 103A, 103B, 103C, 103D, 103E, and 103F may replace the etching pattern 103 in the diaphragms 102 of the above micro speaker structure (10, 10' or 10"). Different etching patterns and location can be used to increase sound pressure level at desired frequency range. In FIG. 5A, the etching pattern 103A includes a plurality of substantially annular recesses arranged in concentric circles around the central axis O of the diaphragms 102. In FIG. 5B, the etching pattern 103B includes a plurality of arc recesses arranged in concentric circles around the central axis O of the diaphragms 102. In FIG. 5C, the etching pattern 103C includes a plurality of slit-shaped or teardrop-shaped recesses arranged in radial directions of the diaphragms 102 around the central axis O of the diaphragms 102. In FIG. 5D, the etching pattern 103D includes a plurality of teardrop-shaped or strip-shaped recesses arranged in radial directions of the diaphragms 102 around the central axis O of the diaphragms 102. The long axis of each recess may form an angle θ (e.g., about 30 degrees) with a radial direction. In FIG. 5E, the etching pattern 103E includes a plurality of circular recesses arranged in radial directions of the diaphragms 102 around the central axis O of the diaphragms 102. The circular recesses may have the same dimension (e.g., diameter), and may be equidistant from the central axis O. In FIG. 5F, the etching pattern 103F includes a plurality of circular recesses arranged in radial directions of the diaphragms 102 around the central axis O of the diaphragms 102. The circular recesses may have different dimensions (e.g., diameters), and may be arranged arbitrarily (for example, some circular recesses are closer to the central axis O, and some circular recesses are further away from the central axis O).

It should be understood that the configurations or shapes of the etching patterns in FIGS. 5A to 5F are illustrative examples only, and are not intended to be, and should not be construed to be, limiting to the present disclosure. Many alternatives and modifications will be apparent to those skilled in the art, once informed by the present disclosure.

As described above, embodiments of the present disclosure provide a micro speaker structure and the method for forming the same. The micro speaker structure may include an etching pattern formed on the diaphragm (e.g., its bottom surface) to change the characteristic (e.g., increase elasticity) of the diaphragm, so that the sensitivity and the SPL of the micro speaker structure can be enhanced. Moreover, the proposed method of forming an etching pattern in the diaphragm is applicable to the case where the diaphragm is made of photosensitive material.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A micro speaker structure, comprising:

a substrate having a hollow chamber;

a diaphragm disposed over the substrate and covering the hollow chamber, wherein the diaphragm comprises an etching pattern recessed form a first surface of the diaphragm;

a coil embedded in the diaphragm;

a carrier board disposed on a bottom surface of the substrate; and a first permanent magnetic element disposed on the carrier board and in the hollow chamber, wherein the first surface of the diaphragm faces the first permanent magnetic element, wherein the coil and the etching pattern are located at the same side of the diaphragm, and wherein the thickness of the etching pattern is smaller than a thickness of the coil.

2. The micro speaker structure as claimed in claim 1, wherein a thickness of the etching pattern is smaller than a thickness of the diaphragm.

3. The micro speaker structure as claimed in claim 1, wherein the etching pattern is spaced apart from the coil when viewed in a plan view.

4. The micro speaker structure as claimed in claim 3, wherein the diaphragm comprises a center region and a peripheral region surrounding the center region in the plan view, and wherein the coil is formed in the center region and the etching pattern is formed in the peripheral region.

5. The micro speaker structure as claimed in claim 1, wherein the etching pattern comprises an annular, arc-shaped, slit-shaped, teardrop-shaped, strip-shaped, or circular recess.

6. The micro speaker structure as claimed in claim 1, wherein the diaphragm comprises a photosensitive polymer material.

7. The micro speaker structure as claimed in claim 1, wherein the diaphragm comprises a non-photosensitive polymer material.

8. The micro speaker structure as claimed in claim 1, further comprising:

an etch stop layer disposed over the first surface of the diaphragm and directly below the coil, wherein the etching pattern is exposed at the first surface and not covered by the etch stop layer.

9. The micro speaker structure as claimed in claim 1, wherein the carrier board comprises one or more vent holes, and the one or more vent holes allow the hollow chamber to communicate with an external environment.

10. The micro speaker structure as claimed in claim 1, further comprising:

a lid wrapped around the substrate and the diaphragm, wherein the lid has a lid opening that exposes a portion of a second surface of the diaphragm opposite the first surface.

11. The micro speaker structure as claimed in claim 10, further comprising:

a second permanent magnetic element disposed on the lid, wherein the diaphragm and the coil are located between the first permanent magnetic element and the second permanent magnetic element.

12. The micro speaker structure as claimed in claim 11, wherein the second permanent magnetic element is disposed under the lid opening.

13. The micro speaker structure as claimed in claim 1, wherein the coil comprises a first metal layer and a second metal layer, and wherein the first metal layer has a spiral structure surrounding a central axis of the diaphragm, and the second metal layer crosses over the spiral structure of the first metal layer and is electrically connected to the first metal layer.

* * * * *